United States Patent
Edwards et al.

(10) Patent No.: US 8,363,534 B2
(45) Date of Patent: Jan. 29, 2013

(54) REVERSE OPTICAL MASTERING FOR DATA STORAGE DISK REPLICAS

(75) Inventors: Jathan D. Edwards, Afton, MN (US); Donald J. Kerfeld, St. Paul, MN (US)

(73) Assignee: Legger Col. A.B. LLC, Dover, DE (US)

( * ) Notice: Subject to any disclaimer, the term of this patent is extended or adjusted under 35 U.S.C. 154(b) by 0 days.

(21) Appl. No.: 13/089,994

(22) Filed: Apr. 19, 2011

(65) Prior Publication Data

US 2011/0223369 A1    Sep. 15, 2011

Related U.S. Application Data

(60) Continuation of application No. 12/852,139, filed on Aug. 6, 2010, now Pat. No. 7,952,986, which is a continuation of application No. 12/584,454, filed on Sep. 4, 2009, now Pat. No. 7,801,016, which is a continuation of application No. 10/790,965, filed on (Continued)

(51) Int. Cl.
  *G11B 7/24* (2006.01)
(52) U.S. Cl. .................... 369/275.4; 369/275.1
(58) Field of Classification Search .......... None
  See application file for complete search history.

(56) References Cited

U.S. PATENT DOCUMENTS

| | | | |
|---|---|---|---|
| 3,565,978 A | 2/1971 | Folger | |
| 3,842,194 A | 10/1974 | Clemens | |
| 4,150,398 A | 4/1979 | Kojima | |
| 4,304,806 A | 12/1981 | Anderson | |
| 4,308,337 A | 12/1981 | Roach | |
| 4,374,077 A | 2/1983 | Kerfeld | |
| 4,517,668 A | 5/1985 | Takaoka | |
| 4,519,065 A | 5/1985 | Lewis | |
| 4,619,804 A | 10/1986 | Leonard | |
| 4,650,735 A | 3/1987 | De Laat | |
| 4,845,000 A | 7/1989 | Takeoka | |
| 4,947,384 A | 8/1990 | Suzuki | |

(Continued)

FOREIGN PATENT DOCUMENTS

| | | |
|---|---|---|
| DE | 41 40 712 A1 | 10/1992 |
| EP | 0 444 367 A1 | 2/1990 |

(Continued)

OTHER PUBLICATIONS

Amended Claims for Japanese Application No. 2000-542768, dated Jan. 22, 2008, 2 pages.

(Continued)

*Primary Examiner* — Paul Huber
(74) *Attorney, Agent, or Firm* — Christensen O'Connor Johnson Kindness PLLC

(57) ABSTRACT

A data storage master disk and method of making a data storage master disk. The data storage disk master is for use in a data storage disk replication process. The data storage disk molding processes produces replica disks having a surface relief pattern with replica lands and replica grooves. The method includes providing a master substrate. The master substrate is at least partially covered with a layer of photosensitive material. A surface relief pattern having master lands and master grooves is recorded in the data storage disk master, including the steps of exposing and developing the photosensitive material is controlled to form master grooves extending down to a substrate interface between the master substrate and the layer of photosensitive material, such that the width of the master grooves at the substrate interface corresponds to a desired width of the replica lands.

14 Claims, 9 Drawing Sheets

Related U.S. Application Data

Mar. 2, 2004, now Pat. No. 7,600,992, which is a continuation of application No. 09/850,252, filed on May 7, 2001, now Pat. No. 6,728,196, which is a division of application No. 09/730,246, filed on Dec. 5, 2000, now Pat. No. 6,890,704, which is a continuation-in-part of application No. 09/055,825, filed on Apr. 6, 1998, now abandoned.

(56) References Cited

U.S. PATENT DOCUMENTS

| | | |
|---|---|---|
| 5,096,563 A | 3/1992 | Yoshizawa |
| 5,149,607 A | 9/1992 | De Graaf |
| 5,325,353 A | 6/1994 | Sasaki |
| 5,368,986 A | 11/1994 | Terao |
| 5,381,394 A | 1/1995 | Yanagawa |
| 5,383,176 A | 1/1995 | Inui |
| 5,430,706 A | 7/1995 | Utsunomiya |
| 5,436,885 A | 7/1995 | Okumura |
| 5,477,524 A | 12/1995 | Deguchi |
| 5,504,734 A | 4/1996 | Morita |
| 5,516,469 A | 5/1996 | Santoh |
| 5,576,918 A | 11/1996 | Bar-Gadda |
| 5,581,539 A | 12/1996 | Horie |
| 5,586,109 A | 12/1996 | Inui |
| 5,626,941 A | 5/1997 | Ouano |
| 5,635,267 A | 6/1997 | Yamada |
| 5,701,288 A | 12/1997 | Seong |
| 5,705,105 A | 1/1998 | Inoue |
| 5,723,033 A | 3/1998 | Weiss |
| 5,739,972 A | 4/1998 | Smith |
| 5,751,510 A | 5/1998 | Smith |
| 5,763,037 A | 6/1998 | Ohtomo |
| 5,856,969 A | 1/1999 | Nishiyama |
| 5,878,022 A | 3/1999 | Okada |
| 5,889,756 A | 3/1999 | Ichihara |
| 5,949,587 A | 9/1999 | Takamizawa |
| 5,991,258 A | 11/1999 | Morita |
| 6,002,663 A | 12/1999 | Sandstrom |
| 6,040,030 A | 3/2000 | Utsunomiya |
| 6,058,100 A | 5/2000 | Mieda |
| 6,071,588 A | 6/2000 | Nobumasa |
| 6,091,700 A | 7/2000 | Kobayashi |
| 6,128,273 A | 10/2000 | Horie |
| 6,183,829 B1 | 2/2001 | Daecher |
| 6,190,838 B1 | 2/2001 | Kerfeld |
| 6,232,036 B1 | 5/2001 | Suzuki |
| 6,269,070 B1 | 7/2001 | Kikuchi |
| 6,324,139 B1 | 11/2001 | Nakane |
| 6,382,955 B1 | 5/2002 | Sandstrom |
| 6,411,593 B1 | 6/2002 | Yoon |
| 6,570,826 B2 | 5/2003 | Hosokawa |
| 6,616,867 B2 | 9/2003 | Kerfeld |
| 6,711,118 B1 | 3/2004 | Tajima |
| 6,728,196 B2 | 4/2004 | Edwards |
| 6,829,212 B1 | 12/2004 | Morita |
| 6,890,704 B2 | 5/2005 | Edwards |
| 6,906,993 B2 | 6/2005 | Wang |
| 6,971,116 B2 | 11/2005 | Takeda |
| 7,171,676 B2 | 1/2007 | Takeda |
| 7,349,323 B2 | 3/2008 | Edwards |
| 7,352,685 B2 | 4/2008 | Edwards |
| 7,600,992 B2 | 10/2009 | Edwards |
| 7,801,016 B2 | 9/2010 | Edwards |
| 2003/0017991 A1 | 1/2003 | Yan |
| 2003/0179691 A1* | 9/2003 | Matsumoto et al. ....... 369/275.4 |

FOREIGN PATENT DOCUMENTS

| | | |
|---|---|---|
| EP | 0 418 897 A2 | 9/1990 |
| JP | 59-193560 A | 11/1984 |
| JP | 60-29950 A | 2/1985 |
| JP | 63-112841 A | 5/1988 |
| JP | 64-23440 A | 1/1989 |
| JP | 1-246391 A | 10/1989 |
| JP | 2-10536 A | 1/1990 |
| JP | 2-150325 A | 6/1990 |
| JP | 2-244440 A | 9/1990 |
| JP | 6-60441 A | 3/1994 |
| JP | 7-210900 A | 8/1995 |
| JP | 8-147768 A | 6/1996 |
| JP | 8-306080 A | 11/1996 |
| JP | 9-97452 A | 4/1997 |
| JP | 9-138981 A | 5/1997 |
| WO | 99/52104 A1 | 10/1999 |
| WO | 99/52105 A1 | 10/1999 |
| WO | 00/48172 A2 | 8/2000 |

OTHER PUBLICATIONS

Chinese Office Action dated Jun. 13, 2003, in corresponding Chinese Application No. 99804611.6, filed Apr. 2, 1999, 8 pages.

Claims for Japanese Application No. 2000-542768, dated Jan. 22, 2008, 2 pages.

Japanese Office Action mailed Jan. 22, 2008, in corresponding Japanese Application No. 2000-542768, filed Apr. 2, 1999, 8 pages.

Dill, F., et al., "Characterization of Positive Photoresist," IEEE Transactions on Electron Devices 22(7):445-452, Jul. 1975.

German Office Action dated Oct. 5, 2009, in corresponding German Application No. 199 83 100.9-55, filed Apr. 2, 1999, 3 pages.

International Preliminary Report on Patentability dated Jul. 12, 2000, in corresponding International Application No. PCT/US99/07258, filed Apr. 2, 1999, 11 pages.

International Search Report mailed Aug. 11, 1999, in corresponding International Application No. PCT/US99/07258, filed Apr. 2, 1999, 3 pages.

Japanese Office Action mailed Jul. 17, 2007, in corresponding Japanese Application No. 2000-542768, filed Apr. 2, 1999, 3 pages.

Keizer, E.O., "VideoDisc Mastering," RCA Review 39(1):60-86, Mar. 1978.

Nakamura, S., et al., "High Density Recording for Magneto-Optical Disk Drive," IEEE Transactions on Magnetics 34(2):411-413, Mar. 1998.

Trefonas, III, P., and B.K. Daniels, "New Principle for Image Enhancement in Single Layer Positive Photoresists," in M.J. Bowden (ed.), Advances in Resist Technology and Processing IV, Proceedings of SPIE (Society of Photo-Optical Instrumentation Engineers) 771:194-210, Mar. 1987.

Written Opinion mailed Feb. 9, 2000, in corresponding International Application No. PCT/US99/07258, filed Apr. 2, 1999, 5 pages.

* cited by examiner 0.425 EXAMPLES                 0.375 EXAMPLES

D=112nm
W=156nm

D=91nm
W=146nm

D=101nm
W=186nm

D=68nm
W=185nm

D=78nm
W=234nm

W=205nm
D=64nm

REVERSE OPTICAL MASTERING FOR DATA STORAGE DISK REPLICAS

This application is a continuation of U.S. application Ser. No. 12/852,139, filed on Aug. 6, 2010 now U.S. Pat. No. 7,952,986, which is a continuation of U.S. application Ser. No. 12/584,454, filed on Sep. 4, 2009 now U.S. Pat. No. 7,801,016, which is a continuation of U.S. application Ser. No. 10/790,965, filed Mar. 2, 2004 now U.S. Pat. No. 7,600,992, which is a continuation of U.S. application Ser. No. 09/850,252, filed May 7, 2001 now U.S. Pat. No. 6,728,196, which is a divisional application of U.S. application Ser. No. 09/730,246, filed Dec. 5, 2000 now U.S. Pat. No. 6,890,704, which is a continuation-in-part (CIP) of U.S. application Ser. No. 09/055,825, filed Apr. 6, 1998, now abandoned. The entire content of each of the aforementioned applications is incorporated herein by reference.

TECHNICAL FIELD

The present invention relates generally to the field of manufacture of optical data storage disks, and in particular, to an optical disk mastering process for use in a disk molding process, capable of molding data storage disks containing a high density of information.

BACKGROUND OF THE INVENTION

Optical disks are produced by making a master which has a desired surface relief pattern formed therein. The surface relief pattern is created using an exposure step (e.g., by laser recording) and a subsequent development step. The master is used to make a stamper, which in turn is used to stamp out replicas in the form of optical master substrates. As such, the surface relief pattern, information and precision of a single master can be transferred into many inexpensive replica optical disk substrates.

During the mastering exposure step, the mastering system synchronizes the translation position of a finely focused optical spot with the rotation of the master substrate to describe a generally concentric or spiral pattern of a desired track spacing or "track pitch" on the disk. The generally spiral track forming the desired surface relief pattern as a result of the mastering process can be defined by high regions termed "lands" and lower adjacent regions termed "grooves" and/or pits (i.e., interrupted grooves). The recording power and size/shape of the focused optical spot (spot size) as well as the photosensitive material parameters determine the final geometry revealed in the master disk during the subsequent development step. Normal mastering practice uses high contrast positive photoresist for the photosensitive material.

Conventional mastering typically utilizes laser light with wavelength, $\lambda$, in a range of 350 nm<$\lambda$<460 nm focused through an objective with a numerical aperture (NA) of 0.75 nm<NA<0.90 to give a theoretical Gaussian spot size of:

$$SS = 0.57 \lambda / NA \text{ (full width at half maximum intensity (FWHM))}.$$

Thus, a 350 nm laser light with NA=0.9 gives a theoretical spot size 0.22 microns (FWHM) as the practical limit for conventional optics.

After the master is recorded, it is flooded with developer solution to reveal the exposure pattern applied by the master recording system. The dissolution of the photoresist in the developer solution is in proportion to the optical exposure previously received in the recording process. The dissolution rate of the photoresist can be modeled for given exposure and development conditions (see Trefonus, P., Daniels, B., "New Principal For Imaging Enhancement In Single Layer Positive Photoresist," Proc. of SPIE vol. 771 p. 194 (1987), see also Dill F. et al., "Characterization of Positive Photoresists" IEEE Transactions on Electronic Devices, vol. ED-22 p. 445 (1975).) Expressions explained in these referenced technical papers can be used to model the effects of exposures from several adjacent tracks recorded in the photoresist and subsequently developed. The photoresist dissolution in the developer solution is in proportion to the optical exposure previously received (positive type resist). More accurately, the dissolution rate (R) is given by the Trefonas model as $$R[\text{nm/sec}] = R_0 \times (1-M)^q + R_b$$

Where $R_0$ and $R_b$ are the dissolution rates of the fully exposed and unexposed photoresist (respectively), q is a resist parameter related to the resist contrast and M is the fractional unconverted photoactive compound in the resist. Typical values for commercially available resists are q=3, 10<$R_0$<200 [nm/sec] and $R_b$=0 for normal developer concentrations. The M term is dependent in a point-wise fashion on how much exposure was received in the resist (E(x,y,z)) and the resist's parametric sensitivity "C" per the Dill convention:

$$M(x,y,z) = \exp\{-C \times E(x,y,z)\}.$$

Since optical disk mastering typically uses only 50-200 nm of photoresist thickness, the-z-dependence of exposure can safely be ignored so that the above equations can be combined to give $$R = R_0 (1 - \exp\{-CE(x,y)\})^q;$$

or, with the exposure profile explicitly circular gaussian we may simplify to $$R = R_0 (1 - \exp\{-CkP \exp[-r^2/SS^2]\})^q;$$

Where r measures the radial distance from the center of the spot ($r^2 = x^2 + y^2$), P is the recording power and k is a normalization constant for the guassian function. This dissolution rate, multiplied by the development time ($t_d$), gives the depth of photoresist lost from its initial coating thickness ($T_0$), so that the final resist thickness (T(t)) is given by $T(td) = T_0 - t_d R_0 (1 - \exp\{-CkP \exp[-r^2/SS^2]\})^q$; From this expression one can see how optical exposure (P), development ($t_d$, $R_0$) and photoresist thickness ($T_0$) determines final surface relief pattern.

In some aspects, these expose/development processes may be compared with conventional photography. In photography, either exposure or development may be controlled/adjusted as necessary to obtain desired final development pattern. In this sense, one may consider the expose/development level as one process variable which may alternatively be controlled by recording power, development time, developer concentration, etc.

In the mastering process, it is desirable to simultaneously obtain wide lands (for user recorded features) and grooves of suitable depth for adequate tracking signals (e.g., greater than 50 nm). Higher density data storage disks often require the storage or a greater amount of information within the same or smaller size of disk area, resulting in smaller track pitch (i.e., distance between tracks) design criteria.

Attempts have been made to meet these design criteria. In prior art FIGS. 1-3, surface relief patterns of exemplary master disks formed using conventional disk mastering techniques are illustrated using the above expressions to model the effects of exposures from several adjacent tracks recorded in the photoresist layer and then developed. These comparisons assume (1) typical photoresist and developer parameters, (2) constant development time (=40 sec.), (3) SS=0.23 microns, (4) track pitch of 0.375 microns and initial photoresist thickness of 100 nm. As recording power (or alternatively, development time) is increased to obtain deeper grooves, the residual land width diminishes and lands become more rounded due to overlap exposure from adjacent tracks. Partially developed photosensitive material exhibits a granular roughness greater than that of the photosensitive material as initially coated on the disk. Roughness of lands worsens with deepening of grooves, resulting in additional noise in data readback.

More problems occur when the track pitch approaches the finite size of the mastering spot size. For formats where the desired track pitch is much larger (>2×) than the finite size of the mastering spot size (ss), the photosensitive material erosion of the lands is negligible and conventional mastering can provide wide lands with a >50 nm groove depth, or both (due to overlap exposure from adjacent tracks).

In FIG. 4, exemplary embodiments of the mandatory link between land width and groove depth when using conventional mastering processes is illustrated. (Examples of 0.375 micron and 0.425 micron track pitch with 0.22 micron recording spot size). As the groove depth increases, the land width decreases. The master surface relief pattern geometrics (i.e., land width/groove depth) are constrained for given conditions of track pitch and mastering spot size. This means the designer may not independently specify the desired parameters for replica land width and replica groove depth.

A secondary problem for conventional mastering is that the land width precision is limited by mechanical track pitch precision (e.g., mechanical precision of master recording system), which is increasingly difficult to control as track pitch decreases.

SUMMARY OF THE INVENTION

The present invention provides a data storage master disk and method of making a data storage master disk wherein the user may independently specify the parameters of replica land width and replica groove depth. The data storage master disk is for use in a data storage disk molding process for producing replica disks which are capable of storing a high capacity of information using a variety of disk formats.

In a first embodiment, the present invention provides a method of making a data storage master disk for use in a data storage disk molding process. The data storage disk molding process produces replica disks having a surface relief pattern with replica lands and replica grooves. The method includes the step of providing a master substrate. The master substrate is covered with a layer of photosenstive material having a specified thickness. A surface relief pattern having master lands and master grooves is recorded in the data storage master disk, including the steps of exposing and developing the photosensitive material. The exposing and developing of a specified thickness of a photosensitive material is controlled to form master grooves extending down to a substrate interface between the master substrate and the layer of photosensitive material, such that the width of the master grooves at the substrate interface corresponds to a desired width of the replica lands.

The thickness of the photosensitive material is specified and controlled to correspond to a desired depth of the replica grooves. In another aspect, the thickness of the photosensitive material is specified and controlled in dependence on master recording system spot size, desired track pitch, and desired depth of replica grooves. The step of controlling the exposure and development of the data storage master disk may include the step of controlling the exposing and developing of the photosensitive material to obtain a flat master groove bottom. In another aspect, the step of controlling the exposure and development of the data storage master disk includes the step of controlling the exposing and developing of the photosensitive material to obtain a smooth, flat master groove bottom, with smoothness determined by the master substrate.

The step of controlling the exposing and developing of the photosensitive material may include the step of controlling optical energy for exposing the photosensitive material to a degree sufficient to obtain a desired master groove bottom width after development and removal of the photosensitive material. In another aspect, the step of controlling the exposing and developing of the photosensitive material may include the step of controlling the development of the photosensitive material to a degree sufficient to obtain a desired master groove width after development and removal of the exposed photosensitive material.

The step of exposing and developing the data storage master disk may include the step of forming a groove bottom, wherein the groove bottom is flat relative to the master land. The step of exposing and developing the data storage master disk results in the data storage master disk having a master surface relief pattern defined by the master lands and the master grooves, wherein the surface relief pattern of the replica disks has an orientation which is inverse the orientation of the data storage master disk surface relief pattern.

The present invention may further provide the step of polishing the master substrate optically smooth; and forming a smooth master groove bottom using the master substrate. In one aspect, the step of providing a master substrate includes forming a master substrate made of glass. Preferably, the glass is polished. The photosensitive material may be bonded to the master substrate with or without intermediate layers.

The present invention may further provide for forming a first stamper using the data storage master disk. Replica disks are made using the first stamper. The step of making replica disks using the data storage master disk may be accomplished using a multiple generation stamper process.

In another embodiment, the present invention provides a method of making a replica disk from a master disk using an inverse stamping process. The replica disk is capable of storing high volumes of information. The replica disk includes a surface relief pattern with replica lands and replica grooves. The method includes the step of providing a master substrate. At least a portion of the master substrate is coated with a layer of photosensitive material to form the master disk. A surface relief pattern having master lands and master grooves is recorded in the master disk, including the steps of using a laser beam recorder for exposing the photosensitive material in a desired track pattern having a track pitch, and developing the photosensitive material. The exposing and developing of the photosensitive material is controlled for forming master grooves extending down to a substrate interface between the master substrate and the photosensitive material, such that the width of the master grooves at the substrate interface corresponds to a desired width of the replica lands. A first stamper is formed from the master disk. A second stamper is formed from the first stamper. A replica disk is formed from the second stamper, the replica disk including a surface relief pattern having an orientation which is the inverse of the master disk.

The present invention may further provide the step of controlling the thickness of the layer of the photosensitive material to correspond to a desired depth of the replica grooves. The specified and controlled thickness of the photosensitive material depends on master recording system spot size, desired track pitch, and desired depth of replica grooves.

The step of controlling the exposing and developing of the photosensitive material may include the step of controlling the exposing and developing of the photosensitive material to obtain a flat master groove bottom. Recording a desired track pitch in the photosensitive material may further include the use of a focused laser beam at a spot size which is greater than one half of the track pitch.

The step of a master substrate may include providing a master substrate made of glass. Further, the master substrate may be polished.

In one aspect, the desired track pattern is a spiral track defined by adjacent master lands and master grooves, wherein the steps of exposing/developing the master disks includes forming a wide, flat master groove bottom defined by the disk substrate. The step of recording the master disk includes forming master groove bottoms having a width which does not necessarily depend on the depth of the master groove for a desired track pitch. The resulting depth of the master groove is dependent on the specified thickness of the photosensitive material and the cumulative optical exposure received by the photosensitive layer at a position half way between two adjacent tracks. In particular, this depends on the desired groove bottom width and the ratio of master recording spot size to desired track pitch.

In another embodiment, the present invention provides a master disk. The master disk includes a master substrate. A layer of photosensitive material covers at least a portion of the master substrate. The photosensitive material includes a surface relief pattern in the form of a track pattern defined by adjacent master lands and master grooves. The master grooves extend down to the disk substrate, the master grooves including a master groove bottom and the master lands including a master land top, wherein the master groove bottom is wider than the master land top.

The master groove bottom is generally flat. In particular, the master groove bottom is flat relative to the master land top, and in particular, the master groove bottoms may be wide and flat relative to the master land tops. Preferably, the master groove bottoms include sharp corners. Additionally, all of the master groove bottoms on the exposed/developed master disk are level with each other to the precision of the master substrate flatness. This is important in flying head media applications, such as near field recording techniques, where small lenses fly in proximity to the replica disk surface.

The master grooves may include a groove depth which is proximate the thickness of the photosensitive material for cases where the track pitch is greater than approximately 1.6 times the spot size. In one aspect, the master grooves include a groove depth which is greater than 50 nanometers, track pitch is less than two times the mastering system spot size, and the width of the master groove bottom is greater than 25 percent of desired track pitch. In another aspect, the width of the master groove bottom is greater than 50 percent desired track pitch.

In another embodiment, the present invention provides a disk including a replica substrate having a first major surface and a second surface. The first major surface includes a surface relief pattern in the form of a track pattern defined by adjacent lands and grooves. The track pattern having a track pitch less than 425 nanometers, wherein the grooves extend down into the disk substrate. The grooves include a groove bottom and the replica lands include a land top, wherein the land top is flat. This is particularly important in near field recording techniques, wherein lens-to-media-surface separation is extremely critical.

In one aspect, the land top has a width greater than 25 percent of crack pitch. In one preferred aspect for the track pitch less than or equal to 400 nanometers, the groove depth is greater than 80 nanometers and the land width is greater than 160 nanometers. Preferably, the land top is smooth and has sharp edges. In one preferred embodiment, the land tops are level with each other to the precision of the flatness of the master disk substrate. The land tops are level and at the same elevation relative to the second major surface. This is important in flying head media applications, such as near field recording techniques, where small lenses fly in proximity to the replica disk surface.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principals of the invention. Other embodiments of the present invention and many of the intended advantages of the present invention will be readily appreciated as the same become better understood by reference to the following detailed description when considered in connection with the accompanying drawings, in which like reference numerals designate like parts throughout the figures thereof, and wherein.

DETAILED DESCRIPTION

The present invention includes a data storage master disk and optical disk mastering process for making the unique data storage master disk. The process in accordance with the present invention provides for a master data storage disk having grooves which extend down to the master substrate, resulting in deep, flat, and wide master disk grooves. The master disk can be used in a disk molding process which includes a reverse mastering/inverse stamping process, resulting in replica disks having wide, flat lands with sharp edges, and deep grooves relative to replica disks formed using conventional mastering processes. As such, the present invention is particularly useful in enabling flexible design of surface relief geometry for molded data storage disks containing a high density of information. This includes the ability to create wide, flat land features even in replica disks having a track pitch of less than two times the mastering system laser beam spot size.

Figure 5:
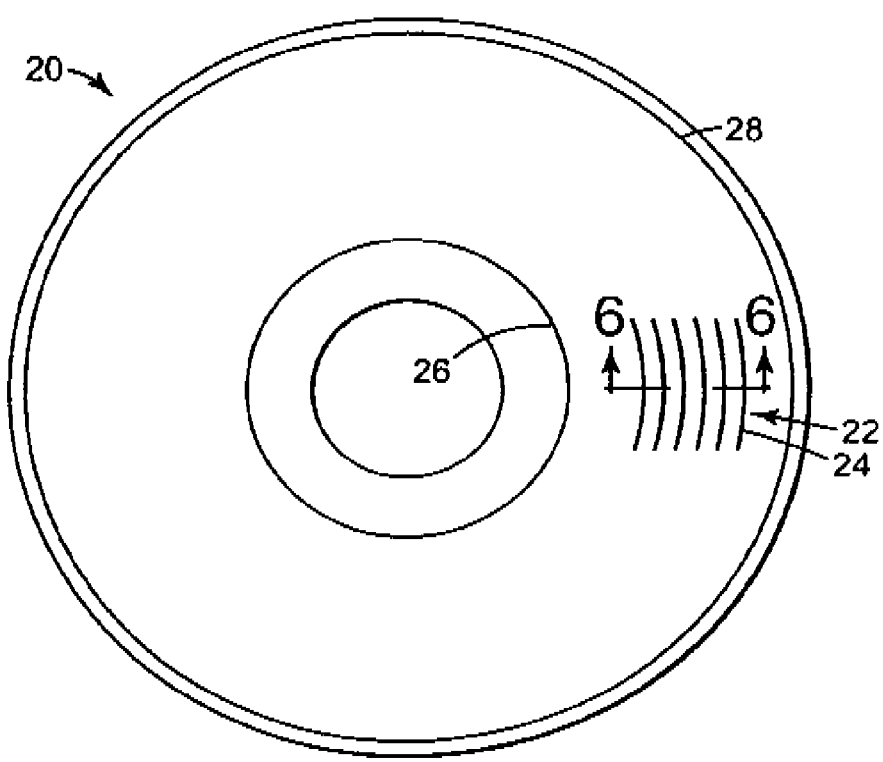
FIG. 5 is a plan view illustrating one exemplary embodiment of a recorded master disk made using a data storage disk mastering process in accordance with the present invention.

In FIG. 5, a data storage master disk 20 in accordance with the present invention is generally shown. Master disk 20 may be used as part of a disk replication process (e.g., a disk molding process) for producing various formats of optical data disks. The data features on the optical data disks may include data pits, grooves, bumps or ridges, and land or land areas. This includes current formats of audio CD, CD-ROM and video disk, such as DVD, as well as future formats which use data features described herein. The definition of optical data disks may include various types of recordable optical disks (e.g., CDR, magneto-optic, or phase-change disk formats, which commonly use features, such as grooves or pits, for tracking and address identification, even though data is subsequently recorded by the users.

Master disk 20 includes a surface relief pattern (i.e., surface geometry) in the form of "data tracks" 22 (shown enlarged for clarity) which may include features representing data encoded therein or which allow the storage, reading, and tracking of data thereon. Data tracks 22 on the optical disk can be arranged in a spiral track 24 originating at the disk center 26 and ending at the disk outer edge 28, or alternatively, the spiral track 24 may originate at the disk outer edge 28 and end at the disk center 26. The data can also lie in a series of concentric tracks spaced radially from the disk center 26. Master disk 20 may or may not include a center hole, and may be hubbed or hubless.

Figure 6:
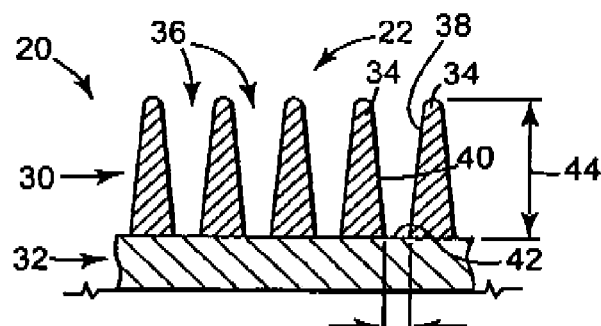
FIG. 6 is an enlarged partial cross-sectional view taken along line 6-6 of FIG. 5.

In FIG. 6, a partial cross-sectional view illustrating one exemplary embodiment of master disk 20 in accordance with the present invention is shown. Master disk 20 includes data layer 30 and master substrate 32 (a portion of which is shown). The data layer 30 includes a surface relief pattern shown as data tracks 22. The data tracks 22 are defined by a series of adjacent master lands 34 and master grooves 36 formed in the data layer 30 (e.g., which form spiral track 24). The master groove sides 38, 40 are defined by adjacent master lands 34, and include a master groove bottom 42 which is defined by the master substrate 32. Master substrate 32 provides for a wide, flat and smooth master groove bottom 42.

Data layer 30 is made of a photosensitive material, and more preferably, is made of a photopolymer or photoresist. Master grooves 36 have a depth 44 which is equal to the height of master lands 34 relative to master substrate 32, and related to the initial thickness of data layer 30. Master groove depth 44 may further be dependent on mastering spot size, track pitch, and photoresist contrast. Preferably, master grooves 36 have a depth greater than 50 nm, and which typically ranges between 50 nm and 120 nm. Master groove bottom 42 is preferably flat and smooth as defined by master substrate 32, having a width 46 which is preferably greater than 35 percent of the desired track pitch.

In one preferred embodiment, master substrate 32 is made of glass, and is preferably polished and/or optically smooth. The master substrate 32 typically varies in thickness between 5 mm and 6 mm. Data layer 30 can be bonded to master substrate 32. In particular, data layer 30 may be coated directly to master substrate 32 or may include an intermediate layer (which may be a bonding layer).

The disk mastering process in accordance with the present invention provides for master disk 20 having relatively deep master grooves 36 with wide, flat master groove bottoms 42. As such, when master disk 20 is used in a reverse optical disk mastering process, the master lands and master grooves translate into a replica disk having relatively deep grooves and wide flat lands. Such characteristics are preferred for many high density and writeable optical disk formats.

The master groove bottoms defined by the disk mastering process in accordance with the present invention are flat (as opposed to rounded in the conventional process) with smoothness defined by the master substrate (e.g., polished glass) and includes sharp corners. When used in connection with an inverse stamping process, this corresponds to replica disks having wide, flat smooth lands with sharp corners, and deep grooves. Wide, flat lands are advantageous for positioning user recorded data thereon. The sharp corners provide domain confinement for user recorded data (e.g., applications wherein data is magneto-optically recorded on the tops of lands). The wide, flat lands with sharp corners and deep grooves provide for improved tracking or trackability of the media substrate. The replica disk land tops are very smooth, due to the groove bottoms 42 which are defined by the master substrate, which is preferably optically polished glass. The smoothness of the land tops is defined by the substrate interface between the master substrate 32 and the layer of photosensitive material 30. Smoothness of the land tops results in a reduction of noise in subsequent readout of data from the disk.

Further, the wide, flat lands are level with each other, due to the groove bottoms 42 being defined by the master substrate 32. The flat lands are level with each other and at the same elevation, enhancing the flyability of the disk substrate for flying head applications.

Figure 7:
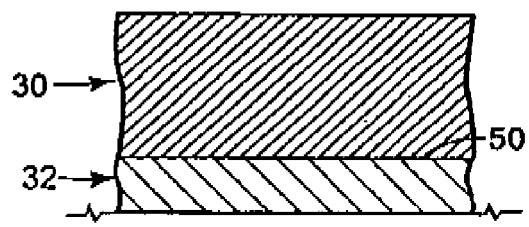
FIG. 7 is an enlarged partial cross-sectional view illustrating a step in making a master disk in accordance with the present invention.
Figure 8:
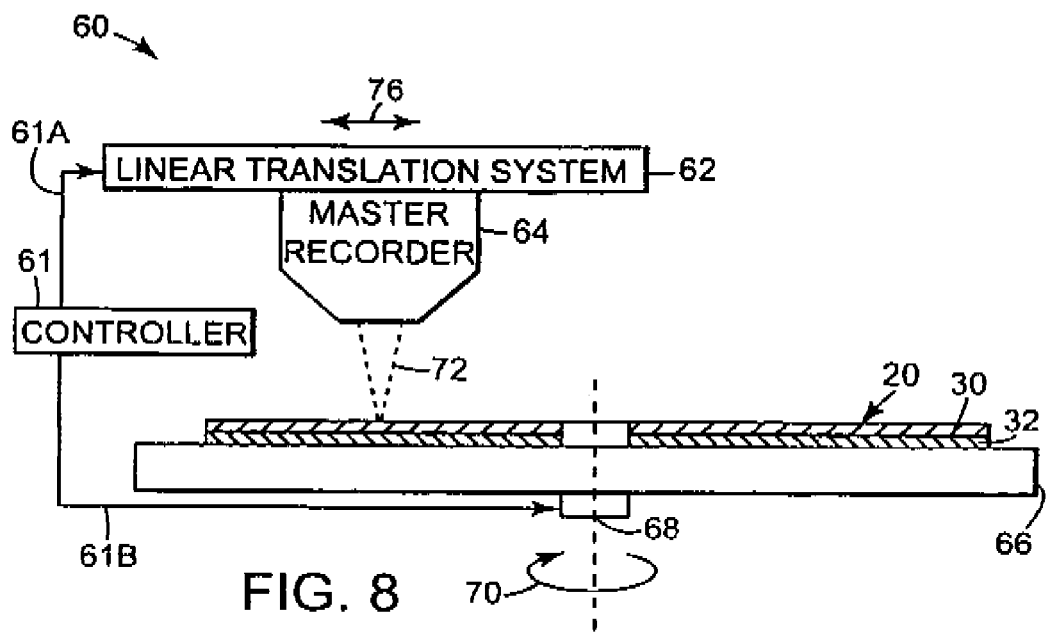
FIG. 8 is a diagram illustrating another step in making a master disk in accordance with the present invention.

Referring to FIGS. 7 and 8, a method of making an optical disk master for use in a data storage disk molding process, in accordance with the present invention, is illustrated. In FIG. 7, master substrate 32 is provided which is preferably made of glass. Master substrate 32 typically ranges in thickness between 5 mm and 6 mm. Master substrate 32 includes major surface 50. Preferably, major surface 50 is polished optically smooth. Major surface 50 is at least partially covered (e.g., coated) by data layer 30. Data layer 30 may also be coated over an intermediate (e.g., bonding) layer 60 (not shown).

Referring to FIG. 8, master disk 20 is positioned on a master recording system (e.g., a laser recorder or a mask recording system). In one exemplary embodiment, the master recording system 60 includes controller 61, linear translation system 62, master recorder 64, and recording table 66. Master recording system 60 provides for controlled exposure of master disk 20 with a focused spot of laser light to encode the desired surface relief pattern (i.e., geometry) or data tracks therein.

Master disk 20 is placed on recording table 66, and can be registered (e.g., centered) about a center axis 68, relative to master recorder 64 using techniques as known in the art, such as through the use of a spindle, or hubbed master disk 20. Recording table 66 is rotatable about the center axis 68, indicated by rotation arrow 70, for rotation of master disk 20 during the disk recording process. Master recorder 64 modulates and focuses a laser beam 72 for exposure of data layer 30 in a desired pattern. Further, master recorder 64 is mechanically coupled to linear translation system 62 which provides for axial movement of master recorder 64 relative to center axis 68, indicated by directional arrow 76.

Controller 61 is coupled to linear translation system 62 and master recorder 64 (indicated at 61A) and is coupled to recording table 66 (indicated at 61B). The controller 61 operates to synchronize the translation position of the finally focused laser beam 72 with the rotation 70 of master disk 20 to expose spiral track 24 in data layer 30. Further, controller 61 may operate to modulate laser beam 72 to expose pit regions (interrupted grooves) in the header area of the disk. Controller 61 can be a microprocessor based programmable logic controller, a computer, a sequence of logic gates, or other device which may be capable of performing a sequence of logical operations.

In accordance with the present invention, controller 61 operates to control the optical energy of master recording system 60 for exposing the photosensitive material of master disk 20 to a degree sufficient to obtain a desired master groove bottom width after development and removal of the exposed photosensitive material. Controlling the optical energy can include controlling either the recording power or controlling the recording speed for exposing the photosensitive material to a degree sufficient to obtain a desired master groove bottom width after development and removal of the exposed photosensitive material. For example, controller 61 may operate to increase the recording power or decrease the recording speed, thereby increasing optical exposure of the photosensitive material.

The laser recorded master disk 20 is removed from the recording table 66 and flooded with a developer solution to reveal the exposure pattern provided by the master recording system 60. The amount of dissolution of the data layer 30 in the developer solution is in proportion to the optical energy previously received during the recording process. Further, the amount of dissolution of the data layer 30 in the developer solution is in proportion to development process parameters, including the concentration of the development solution, the development time and temperature. The type of development solution can be similar to development solutions used in conventional recording processes as known to those skilled in the art. As such, by controlling the exposure and development processes, the desired surface relief pattern in the photosensitive material can be achieved. Since the master recording system 60 was controlled to fully dissolve portions of the data layer 30 down to the master substrate 32, the resulting master grooves (previously shown in FIG. 6) include master groove bottoms which are defined by the master substrate 32 and, in particular, for recorded track pitches of less than 2 times the mastering spot size. The above master disk process results in master lands having rounded peaks and master grooves having flat, wide and preferably smooth master groove bottoms.

Figure 9:
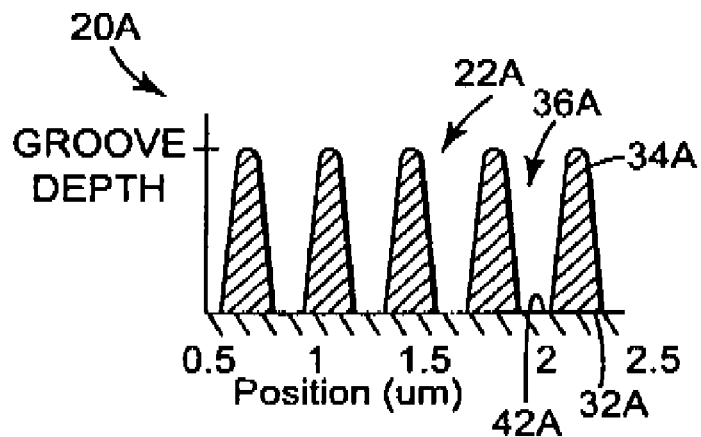
FIG. 9 is a diagram illustrating one exemplary embodiment of the surface geometry of a master disk made using the process in accordance with the present invention.
Figure 10:
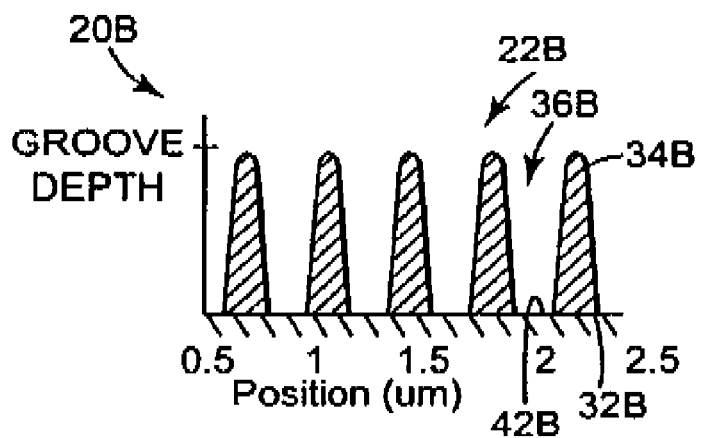
FIG. 10 is a diagram illustrating another exemplary embodiment of the surface geometry of a master disk made using the process in accordance with the present invention.
Figure 11:
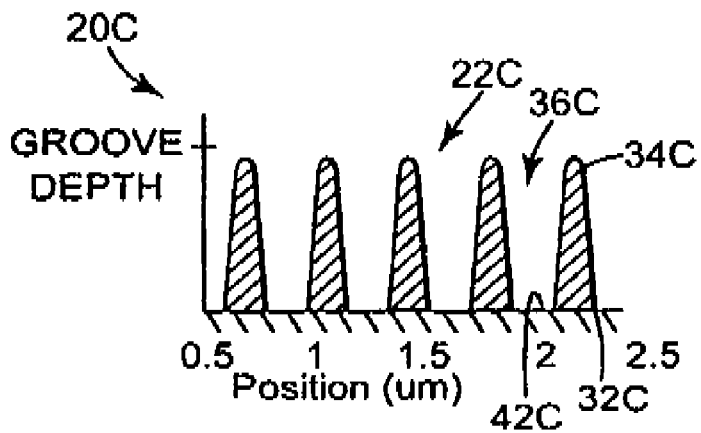
FIG. 11 is a diagram illustrating another exemplary embodiment of the surface geometry of a master disk made using the process in accordance with the present invention.

In FIGS. 9-11, exemplary embodiments are shown illustrating the surface relief pattern or data tracks for master disks 20A, 20B, 20C which have been "overexposed" or "overdeveloped" using the master recording process in accordance with the present invention. With each figure (i.e., FIG. 9-11), the amount of exposure/development of data layer 30 has been increased. Referring to FIG. 9. the master recording/developing process resulted in master lands 34A defining master grooves 36A exposed down to master substrate 32A. Master grooves 36A have a groove depth of 92 nm with a corresponding flat master groove bottom 42 having a width of 120 nm. Similarly, FIG. 10 illustrates surface relief pattern or data tracks 22B having master lands 34B which define master grooves 36B down to master substrate 32B. The master grooves 36B have a groove depth of 88 nm and a corresponding flat master groove bottom 42 which is 160 nm wide. FIG. 11 illustrates master disk 20C having master lands 34C which define master grooves 36C having master groove bottom 42C defined by master substrate 32C. Master groove 36C has a groove depth of 82 nm and a flat groove bottom 42 which is 200 nm wide. The more master disk 20 is overexposed during disk recording process, the greater the erosion of the master lands and wider master groove bottoms are achieved.

Figure 1:
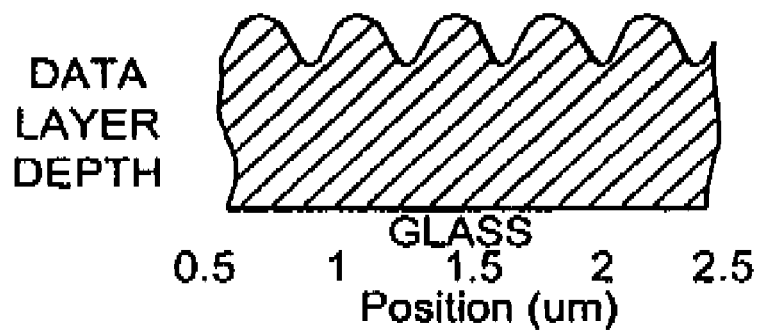
FIG. 1 is a partial cross section illustrating the surface relief pattern of a prior art recorded master disk.
Figure 2:
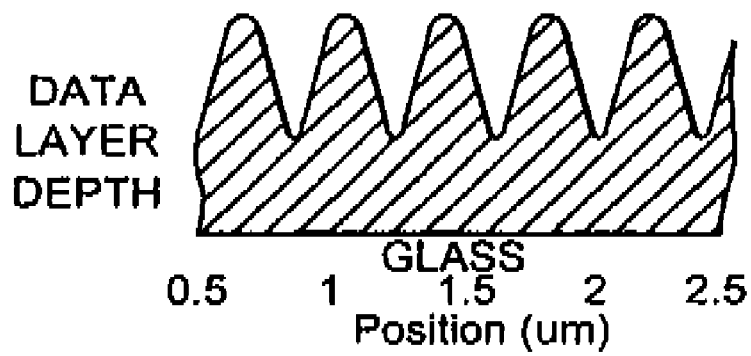
FIG. 2 is a partial cross-section illustrating the surface relief pattern of another master disk made using a prior art recording process.
Figure 3:
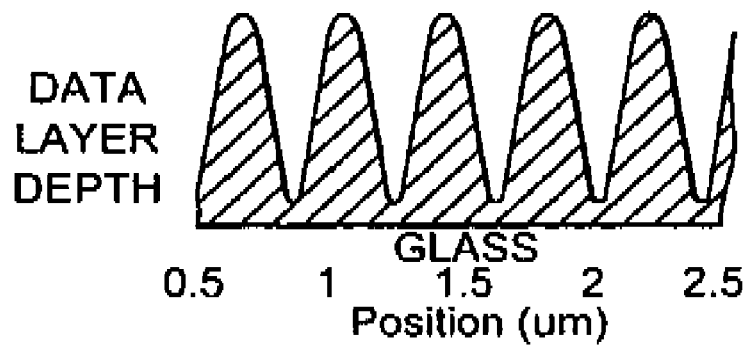
FIG. 3 is a partial cross-section illustrating the surface relief pattern of another master disk made using a prior art recording process.
Figure 4:
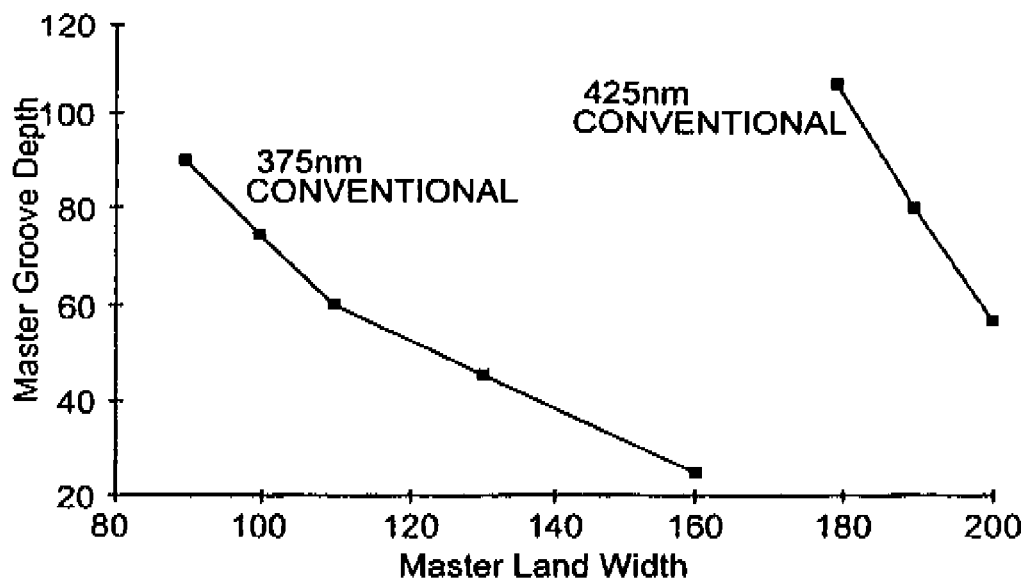
FIG. 4 is a graph illustrating master groove depth versus master land width for a master disk made using prior art mastering/recording techniques.
Figure 12:
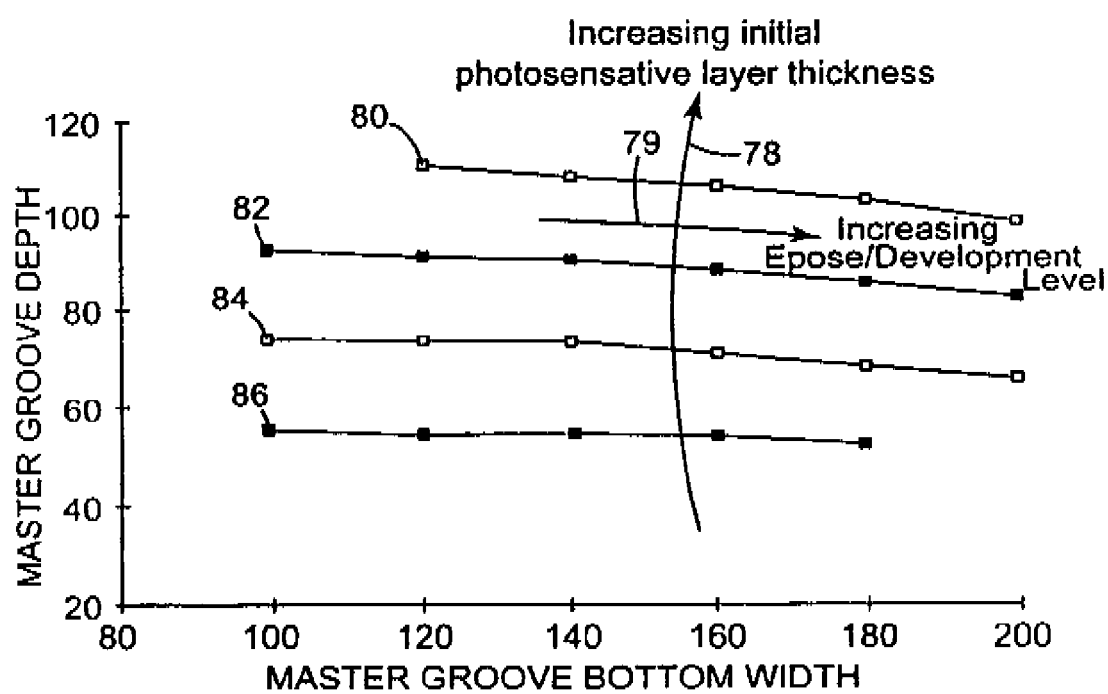
FIG. 12 is a graph illustrating maximal master groove depth versus master groove bottom width for examples of master disks made using the mastering process in accordance with the present invention.
Figure 13:
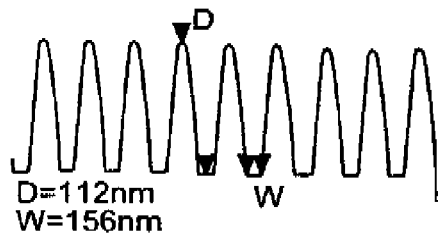
FIGS. 13-18 illustrate experimental atomic force microscope traces of several differing surface relief geometries for master disks recorded at 0.375 and 0.425 micron track pitch using the mastering process in accordance with the present invention.
Figure 16:
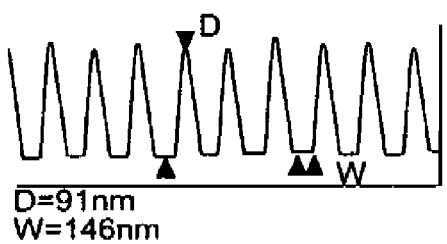
Figure 14:
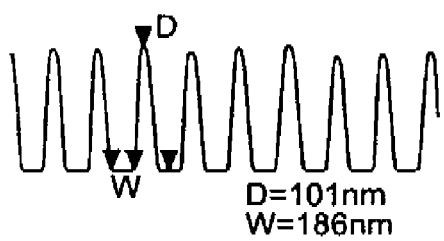
Figure 17:
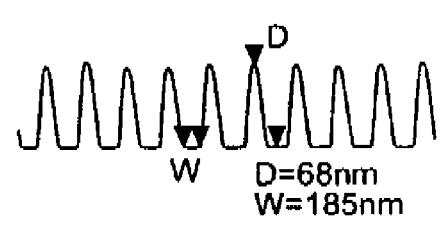
Figure 15:
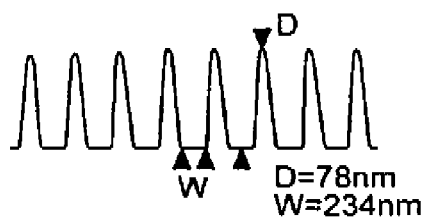
Figure 18:
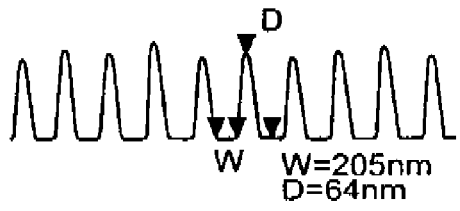

In FIG. 12, a graph illustrating the corresponding relationship between master groove bottom width and master groove depth using the master recording process in accordance with the present invention is shown. Using conventional mastering processes, for a given data layer thickness, master groove depth and master groove bottom width are linked and dependent upon each other (see FIG. 4). Using the mastering process in accordance with the present invention, by selection of the initial thickness of the data layer and expose/development level, one can independently specify groove bottom width and groove depth. In other words, master groove depth is not dependent upon master groove bottom width, and master groove bottom width is not dependent upon master groove depth. The two parameters are separable, and by selecting a desired data layer thickness, and controlling exposure and development criteria, a desired design criteria for the master disk may be obtained.

In the exemplary embodiment shown, plots are shown illustrating design criteria achieved by increasing initial photosensitive (data) layer thickness (plot 78) and/or increasing exposure energy/development of the photosensitive layer (plot 79). In all examples, a 0.22 micron spot size is assumed. Plot 80 had an initial data layer thickness of 120 nm, plot 82 had an initial data layer thickness of 100 nm, plot 84 had an initial data layer thickness of 80 nm, and plot 86 had an initial data layer thickness of 60 nm. As illustrated, master surface geometries are no longer constrained by the master land width to master groove depth linkage as in conventional mastering processes. By starting with different initial data layer thicknesses and controlling expose/development level, any point within the width-depth parameter space may be obtained using the disk mastering process in accordance with the present invention. Whereas FIG. 12 shows how by starting with differing initial photosensitive material thickness that any point in the width-depth parameter space may be obtained, FIGS. 13-18 show corroborating experimental results illustrated by atomic force microscope (AFM) traces of several differing geometries at 0.375 and 0.425 micron track pitch using the disk mastering process in accordance with the present invention.

Figure 19:
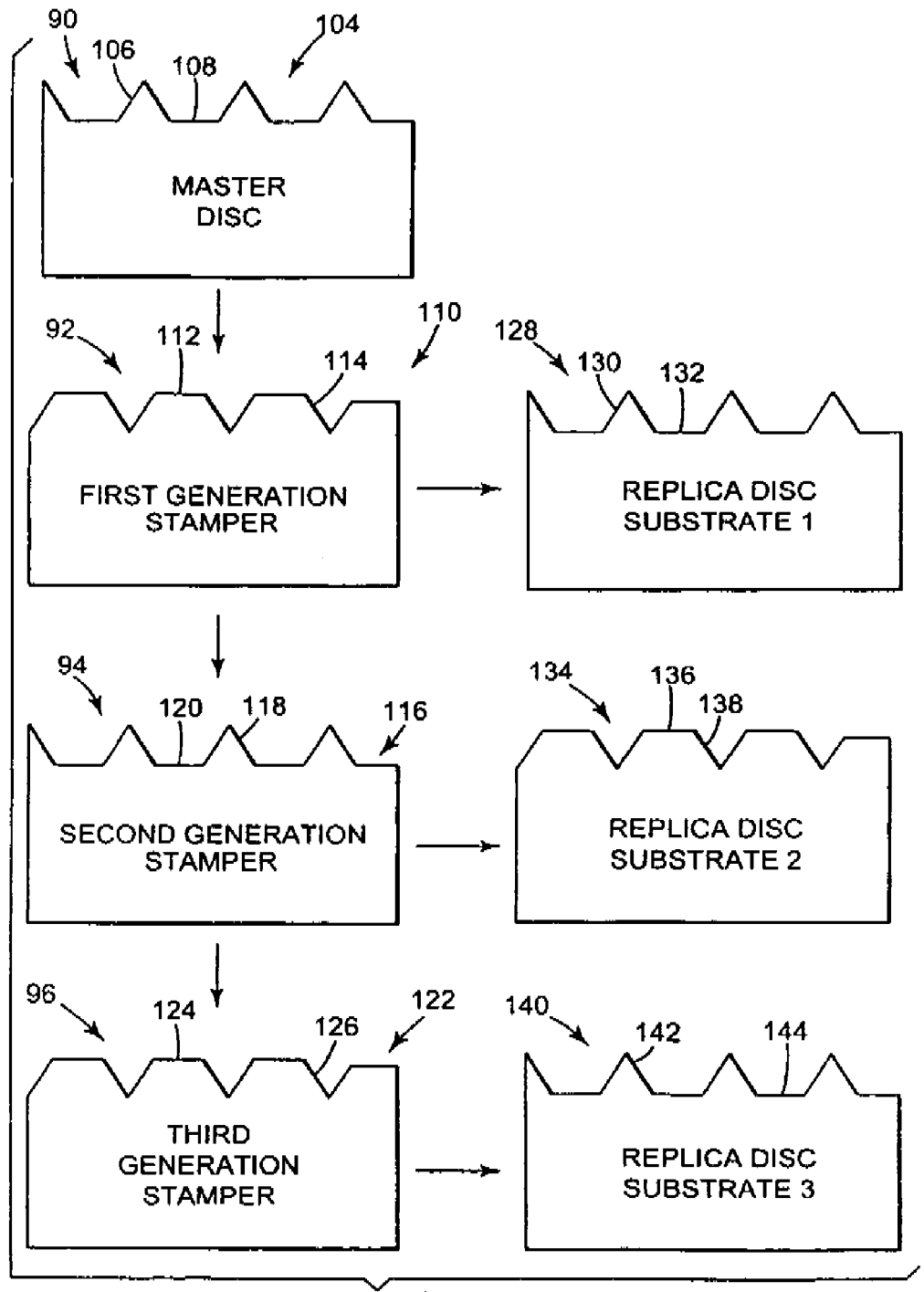
FIG. 19 is a diagram illustrating groove orientation for replica disks made from a master disk in accordance with the present invention, using a multiple generation disk molding/replication process.

The mastering recording process in accordance with the present invention is (preferably) used in a reverse mastering or inverse stamping process, for creation of replica disks having wide, flat (and smooth) land features at track pitches less than two times the mastering system spot size. In FIG. 19, a diagram illustrating "groove" orientation of an optical disk substrate (i.e., a replica disk) molded from a first generation stamper, a second generation stamper or a third generation stamper formed from a master disk in accordance with the present invention, is shown. The diagram includes enlarged, partial cross-sections illustrating the orientation of the data tracks of a master disk 90, first generation stamper 92, second generation stamper 94, third generation stamper 96, replica disk substrate 1, replica disk substrate 2, and replica disk substrate 3. Data tracks are recorded onto the master disk 90, and have an orientation based on whether a replica disk substrate is molded from a first, second or third generation stamper.

In particular, master disk 90 includes master data layer 104 having master lands 106 and master grooves 108. First generation stamper 92 includes first generation stamper data layer 110 having first generation stamper lands 112 and first generation stamper grooves 114. Second generation stamper 94 includes second generation stamper data layer 116 having second generation stamper lands 118 and second generation stamper grooves 120. Third generation stamper 96 includes third generation stamper data layer 122 having third generation stamper lands 124 and third generation stamper pits 126. Similarly, replica disk substrate 1 includes substrate 1 data layer 128 having substrate 1 lands 130 and substrate 1 grooves 132; replica disk substrate 2 includes substrate 2 data layer 134 having substrate 2 lands 136 and substrate 2 grooves 138; and replica disk substrate 3 includes substrate 3 data layer 140 having substrate 3 lands 142 and substrate grooves 144.

The orientation of substrate I, data layer 128 molded from first generation stamper 92 corresponds to the orientation of the master disk data layer 104. In particular, the first generation stamper data layer 110 is the inverse of the master disk layer 104. Similarly, replica disk substrate 1 data layer 128 is the inverse of the first generation stamper data layer 110.

Second generation stamper 94 data layer 116 is the inverse of the first generation stamper 92 data layer 110, resulting in replica disk substrate 2 data layer 134 being the inverse of second generation stamper 94 data layer 116 and master disk data layer 104. Likewise, third generation stamper 96 data layer 122 is the inverse of the second generation stamper 94 data layer 116. Accordingly, disk substrate 3, data layer 140 is the inverse of the third generation stamper data layer 122, and corresponds or has the same orientation as the master disk data layer 104.

It is recognized that the desired orientation of the master disk data layer 104 is dependent on the desired orientation of the replica disk substrate for its intended use. For the example of high-density replica disks having track pitches less than two times the mastering system spot size (and air incident media), it is desirable to use a master disk form using the master disk recording process in accordance with the present invention and a second generation stamper process, resulting in a replica disk having wide, flat, smooth lands and deep grooves. Alternatively, for disks read through the substrate, a master disk formed using the master disk recording process in accordance with the present invention may be used in a first generation stamper or third generation stamper process where it is desired to mold a replica disk having flat pits or grooves.

In one preferred embodiment, a master disk made using the master disk recording process in accordance with the present invention is utilized in a second generation disk molding process. Suitable disk molding processes including one suitable second generation disk molding process capable of making multiple optical disk stampers from one master disk is as disclosed in U.S. Pat. No. 6,365,329, the disclosure of which is incorporated herein by reference. The above-referenced patent utilizes a unique disk molding process which includes a photopolymerization step which is non-destructive to either the recorded master, first generation stamper or second generation stamper. This allows many next generations stampers to be made, while maintaining the integrity of the data layer transferred from the previous generation disk. In one embodiment, a portion of a first stamper which defines the data layer is transferred to and becomes part of a second stamper without changing the integrity of the data layer.

Alternatively, other stamper processes may be utilized. For example, in another exemplary embodiment an electroforming pyramiding family process is used. This process involves the electroforming of a "father" stamper or first generation stamper from a master disk formed using the process in accordance with the present invention. The father stamper is cleaned, treated and returned to the nickel bath to plate a "mother" or second generation stamper. This process cycle can be repeated several times, resulting in multiple "mother" stampers or second generation stamper being made from a single father or first generation stamper. The same electroforming process may be repeated using the "mother" stamper to make several "daughter" or third generation stampers from each mother.

Figure 20:
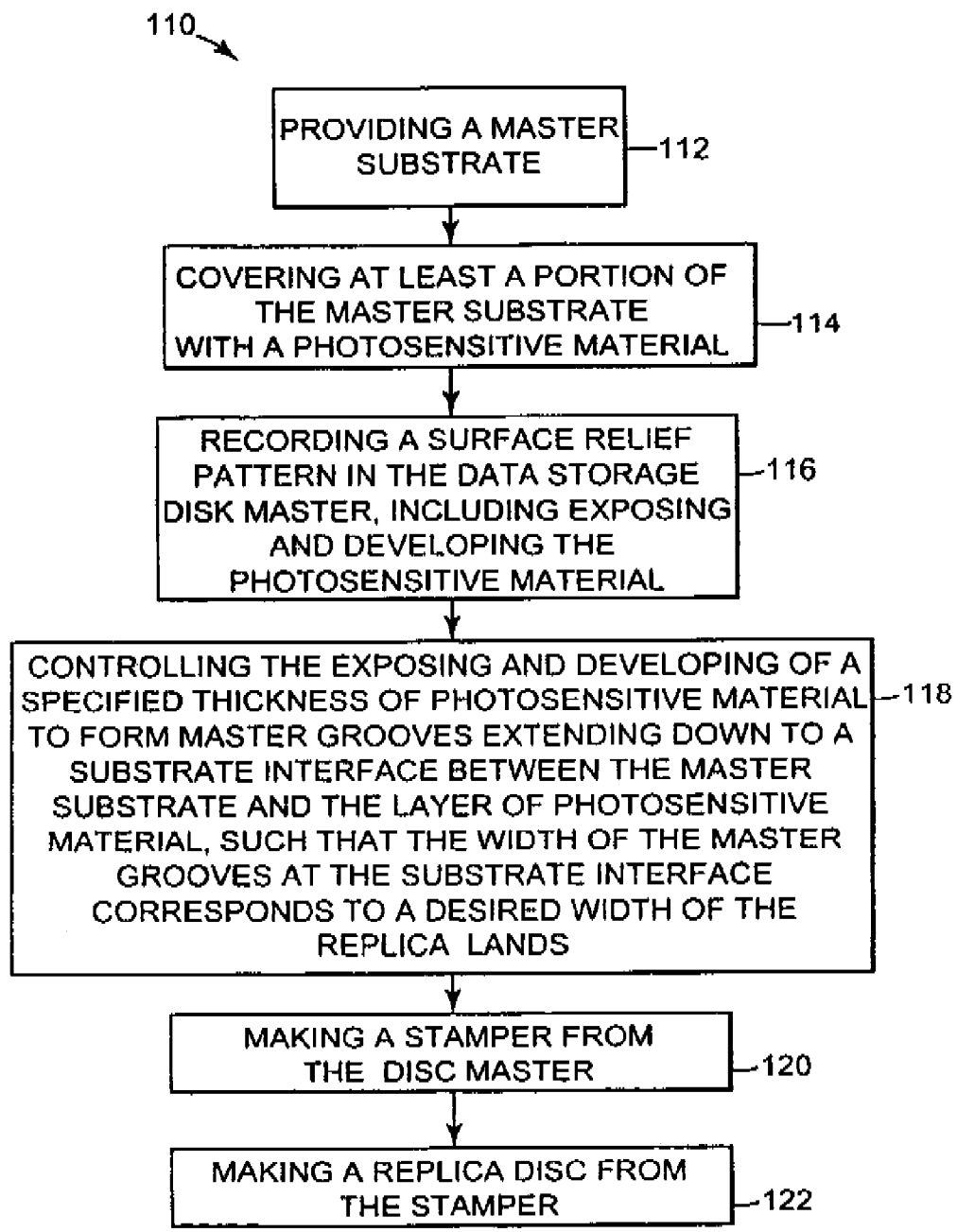
FIG. 20 is a block diagram illustrating a data storage disk mastering process in accordance with the present invention.

In FIG. 20, a block diagram illustrating a process for making a replica disk using a master disk made in accordance with the present invention is shown at 110. The master disk is for use in a data storage disk molding process. The data storage disk molding process produces replica disks having a surface relief pattern with replica lands and replica grooves. In the exemplary embodiment shown, the process 110 begins with providing a master substrate (112). The master substrate is at least partially covered with a photosensitive material, which is preferably made of photoresist (114). A surface relief pattern having master lands and master grooves is recorded in the data storage master disk, including the steps of exposing and developing the photosensitive material (116). The exposing and developing of a specified thickness of photosensitive material is controlled to form master grooves extending down to substrate interface between the master substrate and the layer of photosensitive material, such that the width of the master grooves at the substrate interface corresponds to a desired width of the replica lands (118).

The master disk can now be used to make a replica disk in a disk molding process. In particular, a stamper is made from the optical master disk (120). A replica disk is made from the stamper (122). The replica disk is capable of storing high volumes of information. In one application this invention is particularly useful for recording track pitches that are less than 2 times the master recorder spot size.

Figure 21:
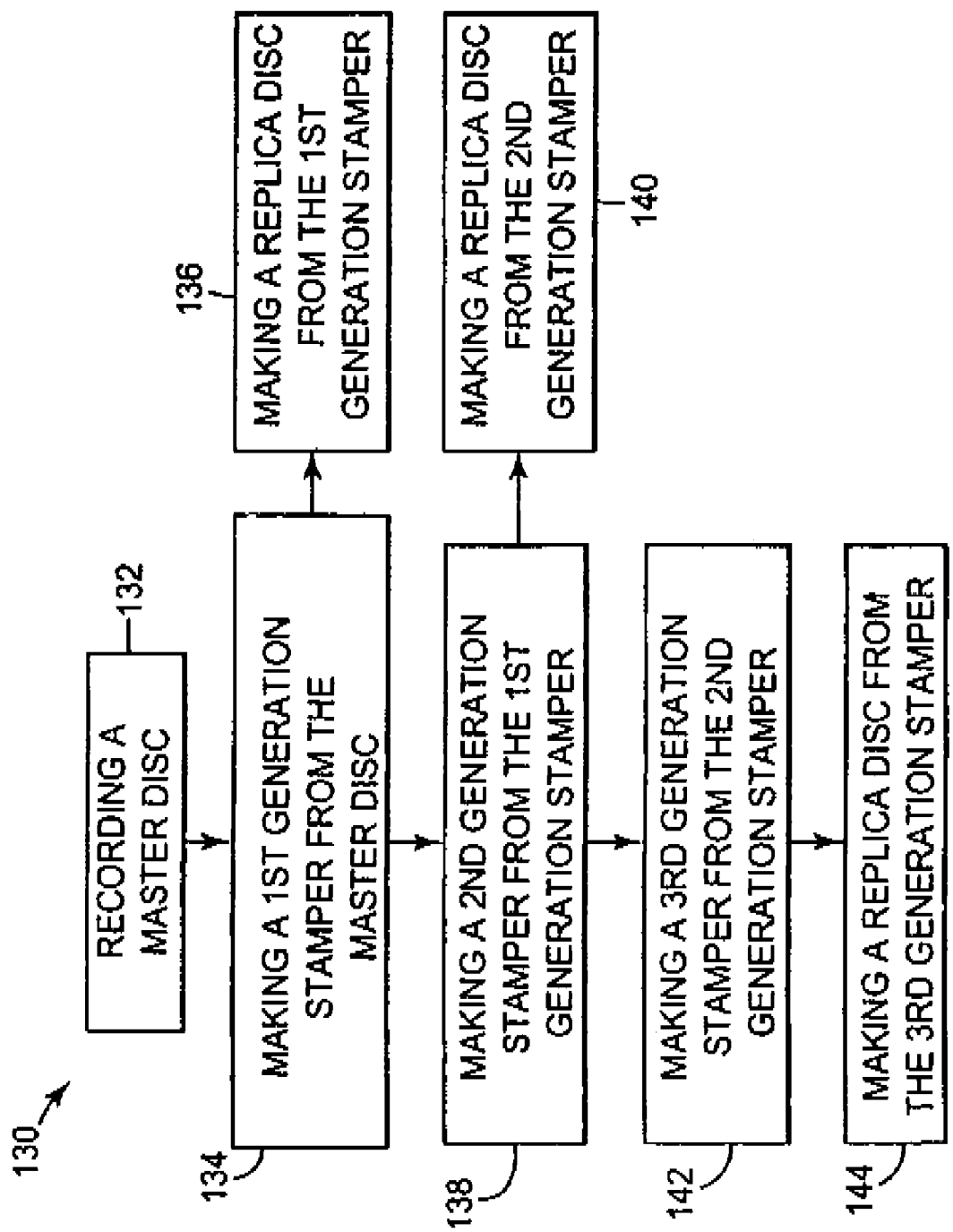
FIG. 21 is a block diagram illustrating a process for making a replica disk using a master disk in accordance with the present invention.

In FIG. 21, a block diagram illustrating one exemplary embodiment of using a master disk in accordance with the present invention in a multiple generation disk molding process is shown at 130. The master disk is fabricated (132) using the unique methods previously described herein. The methods include exposing and developing the data layer down to the master substrate. A first generation stamper is made from the master disk (134). A replica disk may be made from the first generation stamper (136).

Alternatively, a second generation stamper is made from the first generation stamper (138). A replica disk is made from the second generation stamper (140). Further, a third generation stamper can be made from the second generation stamper (142). A replica disk can be made from the third generation stamper (144).

Photosensitive materials include photopolymers or photoresist, or other materials or material blends having similar photosensitive characteristics. One group of suitable photosensitive material includes standard position type high resolution photoresist commercially available from vendors Shipley, OCG, etc. Other suitable photosensitive materials may become apparent to those skilled in the art after reviewing this disclosure.

Suitable photopolymers for use in forming layers, replication layers, or bonding layers discussed herein, include HDDA (4×6×) polyethylenically unsaturated monomer-hexanediol diacrylate; chemlink 102 (3×) monoethylenically unsaturated monomer-diethylene glycol monoethyl ether acrylate, elvacite 2043 (1×3×) organic polymer-polyethylmethacrylate, and irgacure 651 (0.1×0.2) latent radical initiator -2,2-diamethhoxy-2-phenylacetophenone. Another suitable photopolymer includes HHA (hydantoin hexacryulate) 1×, HDDA (hexanediol diacrylate) 1×, and irgacure 651 (0.1× 0.2) latent radical initiator-2,2-dimethyoxy-2phenylacetophenone. Other suitable photopolymers may become apparent to those skilled in the art after reviewing this disclosure.

Numerous characteristics and advantages of the invention have been set forth in the foregoing description. It will be understood, of course, that this disclosure is, and in many respects, only illustrative. Changes can be made in details, particularly in matters of shape, size and arrangement of parts without exceeding the scope of the invention. The invention scope is defined in the language in which the appended claims are expressed. A1,AMD The master groove bottoms defined by the disk mastering process in accordance with the present invention are flat (as opposed to rounded in the conventional process) with smoothness defined by the master substrate (e.g., polished glass) and includes sharp corners. When used in connection with an inverse stamping process, this corresponds to replica disks having wide, flat smooth lands with sharp corners, and deep grooves. Wide, flat lands are advantageous for positioning user recorded data thereon. The sharp corners provide domain confinement for user recorded data (e.g., applications wherein data is magneto-optically recorded on the tops of lands). The wide, flat lands with sharp corners and deep grooves provide for improved tracking or trackability of the media substrate. The replica disk land tops are very smooth, due to the groove bottoms 42 which are defined by the master substrate, which is preferably optically polished glass. The smoothness of the land tops is defined by the substrate interface between the master substrate 32 and the layer of photosensitive material 30. Smoothness of the land tops results in a reduction of noise in subsequent readout of data from the disk. A2,AMD,M In FIG. 12, a graph illustrating the corresponding relationship between master groove bottom width and master groove depth using the master recording process in accordance with the present invention is shown. Using conventional mastering processes, for a given data layer thickness, master groove depth and master groove bottom width are linked and dependent upon each other (see FIG. 4). Using the mastering process in accordance with the present invention, by selection of the initial thickness of the data layer and expose/development level, one can independently specify groove bottom width and groove depth. In other words, master groove depth is not dependent upon master groove bottom width, and master groove bottom width is not dependent upon master groove depth. The two parameters are separable, and by selecting a desired data layer thickness, and controlling exposure and development criteria, a desired design criteria for the master disk may be obtained.

The invention claimed is:

1. A replica disk comprising:
    a replica substrate having a first surface that includes a surface pattern defined by lands and grooves,
    wherein the surface pattern has a track pitch that is less than 425 nanometers,
    wherein the grooves have depths less than 120 nanometers, and
    wherein the lands and grooves are inverse of corresponding features on a master disk used in a process of creating the replica disk.

2. The replica disk of claim 1, wherein the depths of the grooves are less than 40 nanometers.

3. The replica disk of claim 1, wherein the lands have tops with widths between 100 nanometers and 200 nanometers.

4. The replica disk of claim 3, wherein the tops of the lands have widths that are greater than 25 percent of the track pitch.

5. The replica disk of claim 4, wherein the tops of the lands have widths that are greater than 35 percent of the track pitch.

6. The replica disk of claim 1, wherein the lands have tops that are substantially flat and coplanar.

7. The replica disk of claim 1, wherein the depths of the grooves are less than 80 nanometers.

8. The replica disk of claim 3, wherein the tops of the lands have widths between 140 nanometers and 180 nanometers.

9. The replica disk of claim 1, wherein the depths of the grooves are less than 60 nanometers.

10. The replica disk of claim 1, wherein the depths of the grooves are greater than 20 nanometers.

11. A replica disk comprising:
    a replica substrate having a first surface that includes a surface pattern defined by lands and grooves,
    wherein the surface pattern has a track pitch that is less than 425 nanometers,
    wherein tops of the lands define widths that are less than 200 nanometers,
    wherein the widths of the tops of the lands are greater than 25 percent of the track pitch, and
    wherein the lands and grooves are inverse of corresponding features on a master disk used in a process of creating the replica disk.

12. The replica disk of claim 11, wherein the widths of the tops of the lands are greater than 35 percent of the track pitch.

13. The replica disk of claim 11, wherein the tops of the lands are substantially flat and coplanar.

14. The replica disk of claim 11, wherein the tops the lands have widths that are greater than 100 nanometers.

* * * * *

UNITED STATES PATENT AND TRADEMARK OFFICE
CERTIFICATE OF CORRECTION

PATENT NO. : 8,363,534 B2
APPLICATION NO. : 13/089994
DATED : January 29, 2013
INVENTOR(S) : Edwards et al.

It is certified that error appears in the above-identified patent and that said Letters Patent is hereby corrected as shown below:

In the Specification

In Column 2, Line 12, delete "model as" and insert -- model as: --, therefor.

In Column 2, Line 14, delete "+$R_b$" and insert -- +$R_b$; --, therefor.

In Column 2, Line 15, delete "Where" and insert -- where --, therefor.

In Column 2, Line 29, delete "to give" and insert -- to give: --, therefor.

In Column 2, Line 31, delete "$R=R_0(1-\exp\{-CE(x,y)\})^q$;" and insert
-- $R=R_0(1-\exp\{-CE(x,y)\})^q$; --, therefor.

In Column 2, Line 33, delete "simplify to" and insert -- simplify to: --, therefor.

In Column 2, Line 36, delete "Where" and insert -- where --, therefor.

In Column 2, Line 38, delete "guassian" and insert -- gaussian --, therefor.

In Column 2, Line 42, delete "$[-r^2/SS^2\})^q$;" and insert -- $[-r^2/SS^2]\})^q$; --, therefor.

In Column 3, Line 50, delete "photosenstive" and insert -- photosensitive --, therefor.

In Column 8, Line 45, delete "substrate," and insert -- substrate 32, --, therefor.

In Column 13, Line 18, delete "hexacryulate)" and insert -- hexaacrylate) --, therefor.

In Columns 13 & 14, Lines 30-59 & 1-10, delete "A1,AMD..................may be obtained.".

Signed and Sealed this
Thirteenth Day of May, 2014

Michelle K. Lee
*Deputy Director of the United States Patent and Trademark Office*

CERTIFICATE OF CORRECTION (continued)
U.S. Pat. No. 8,363,534 B2

In the Claims

In Column 14, Line 56, in Claim 14, delete "tops the lands" and insert -- tops of the lands --, therefor.